UNITED STATES PATENT OFFICE.

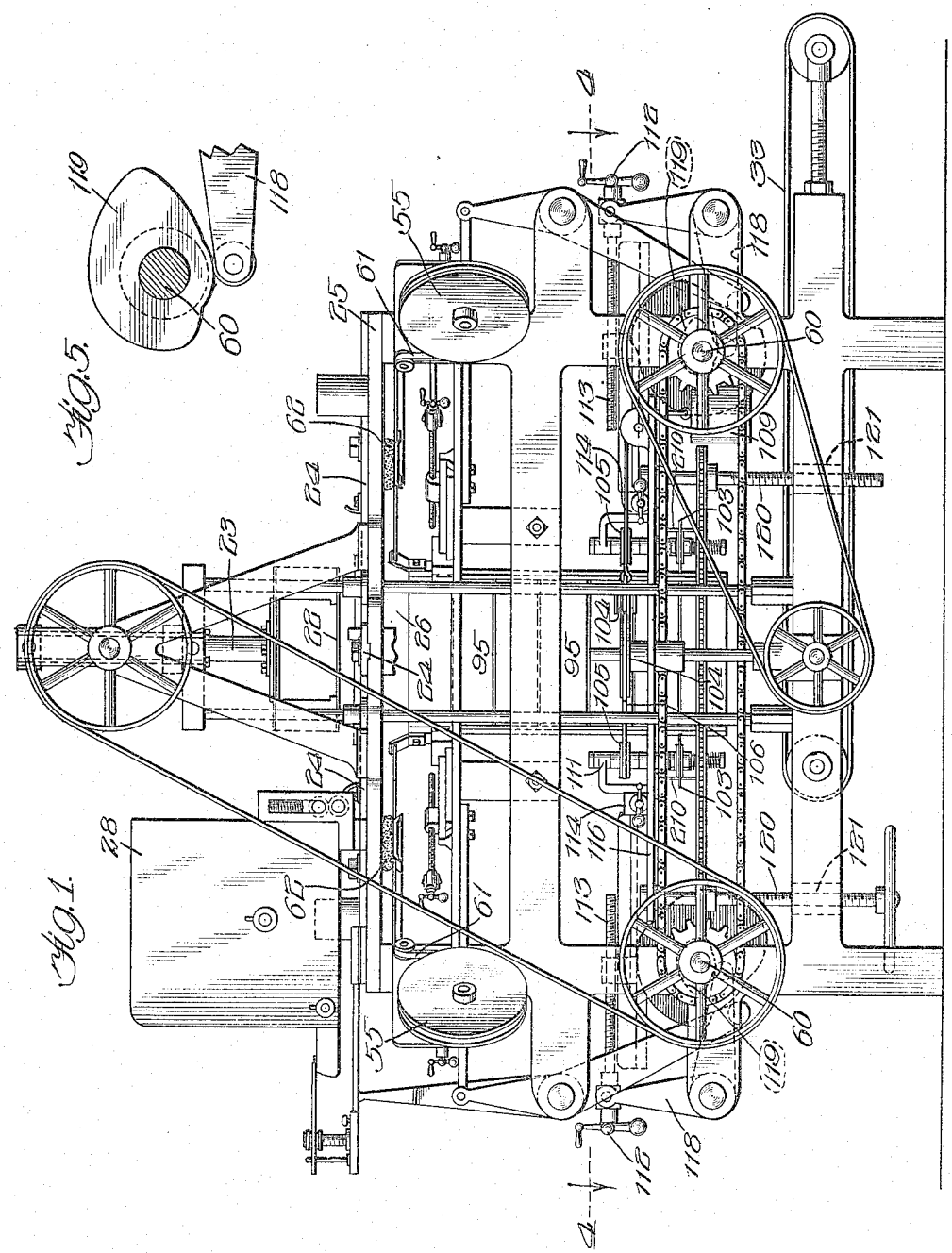

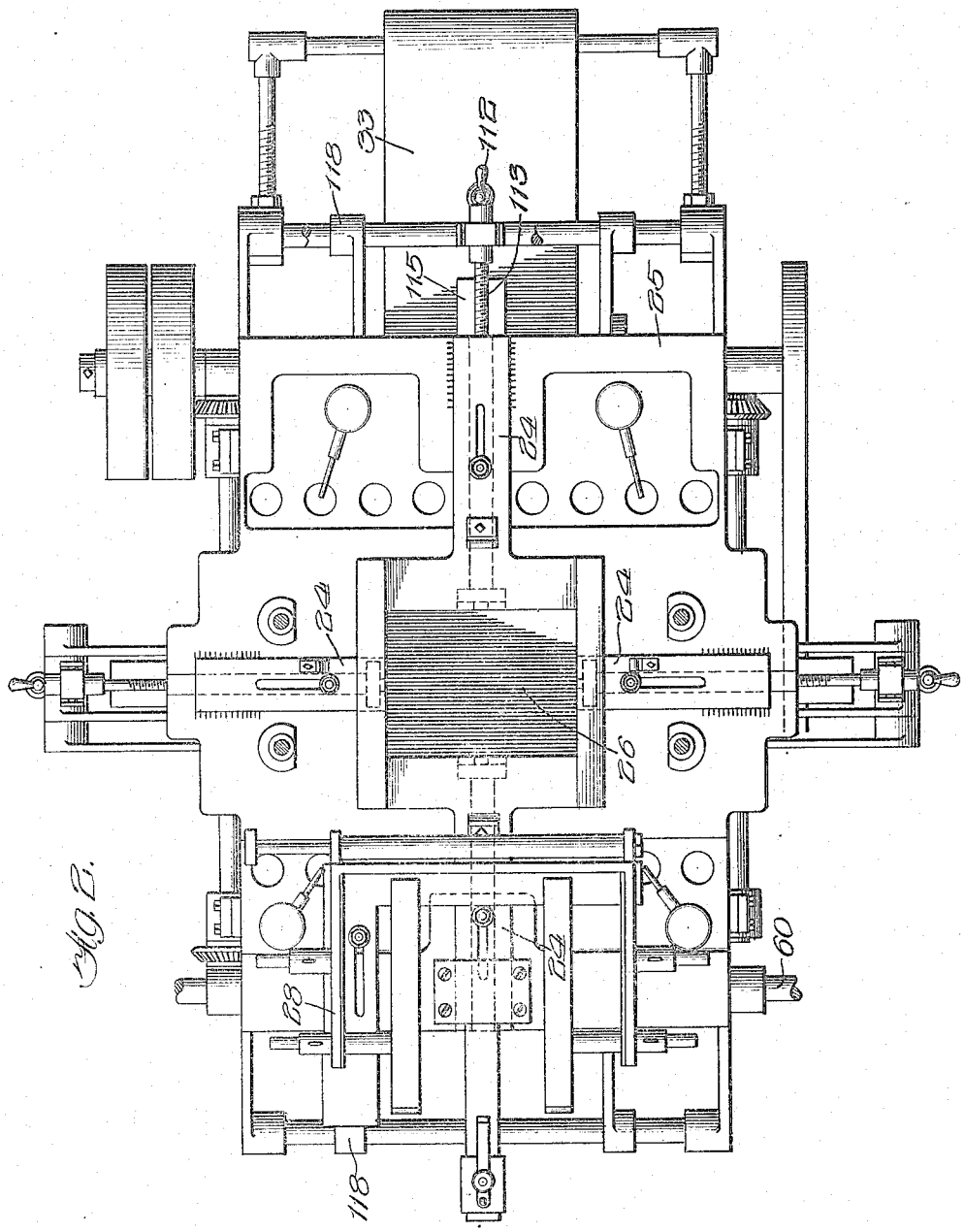

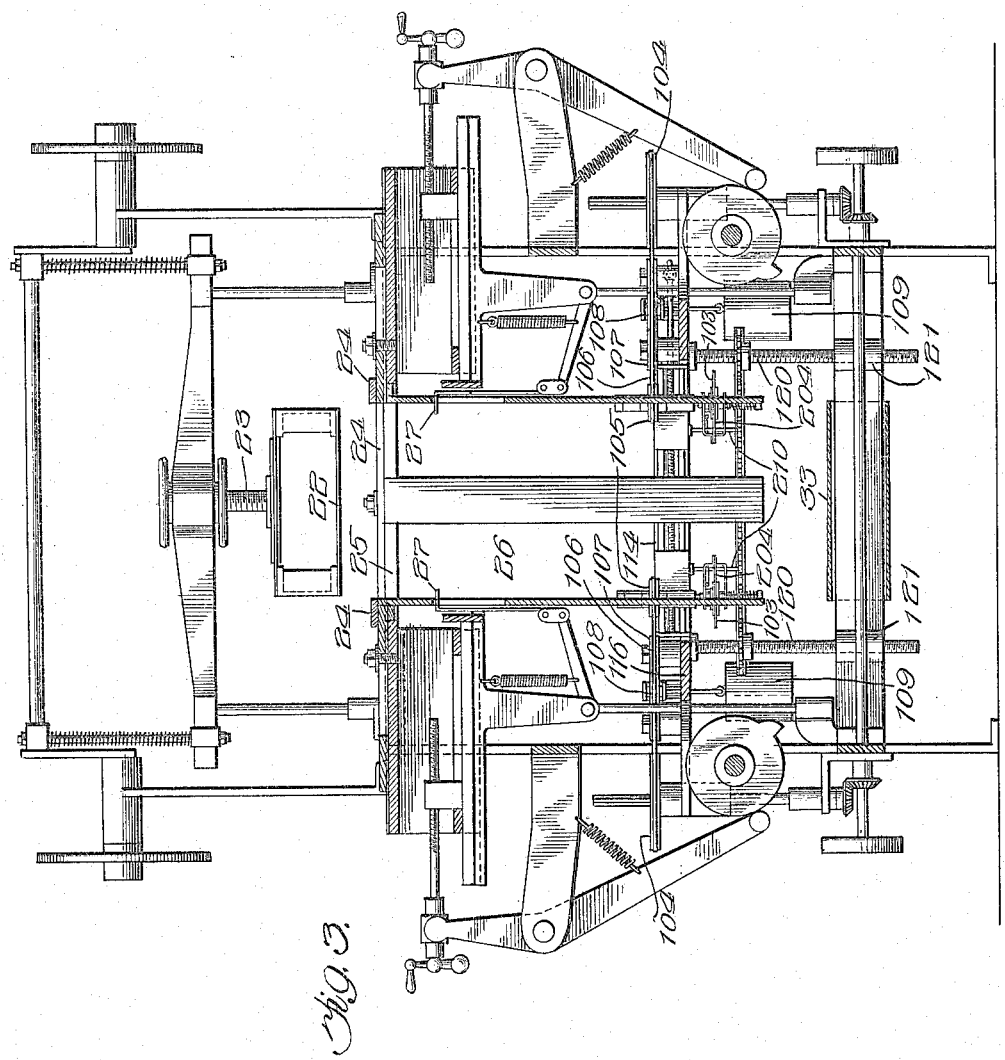

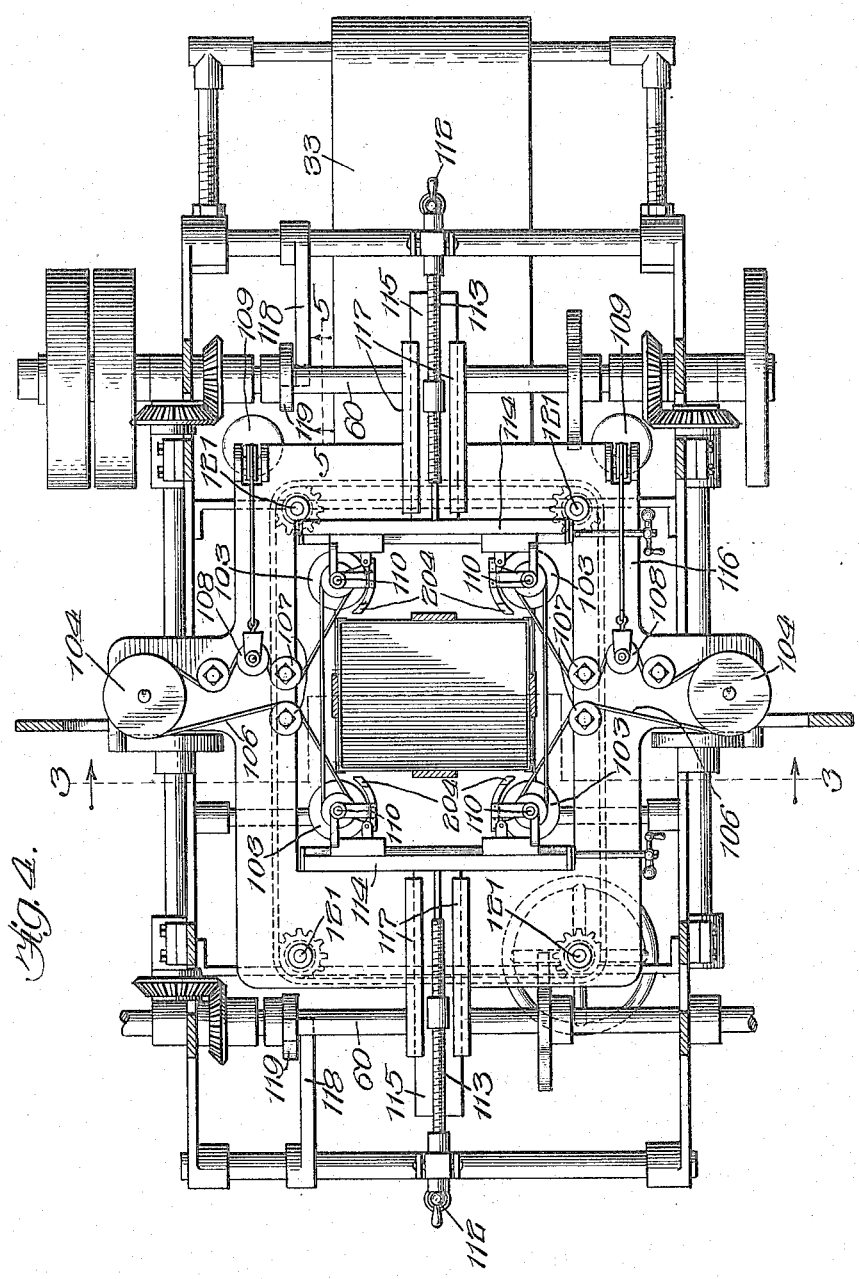

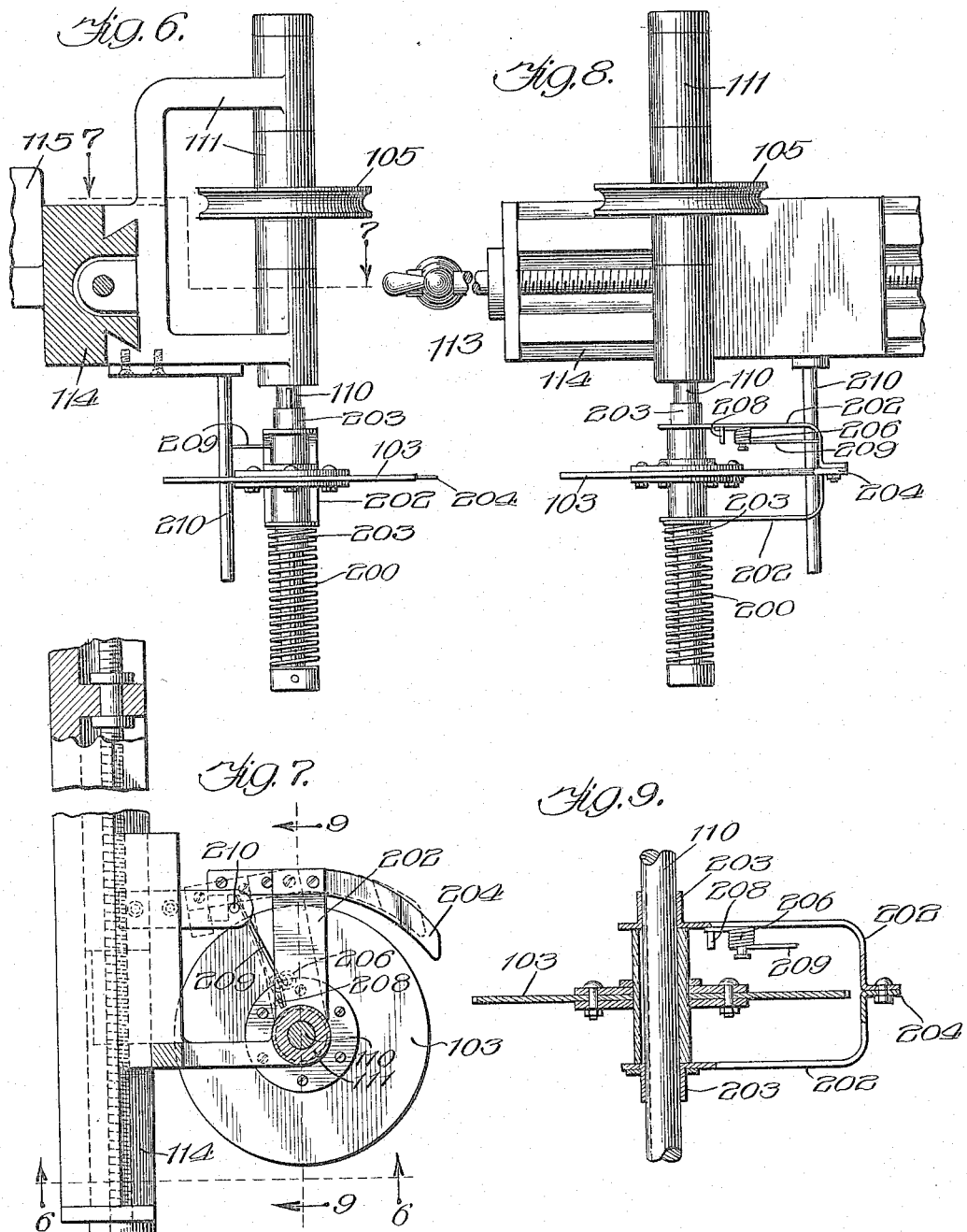

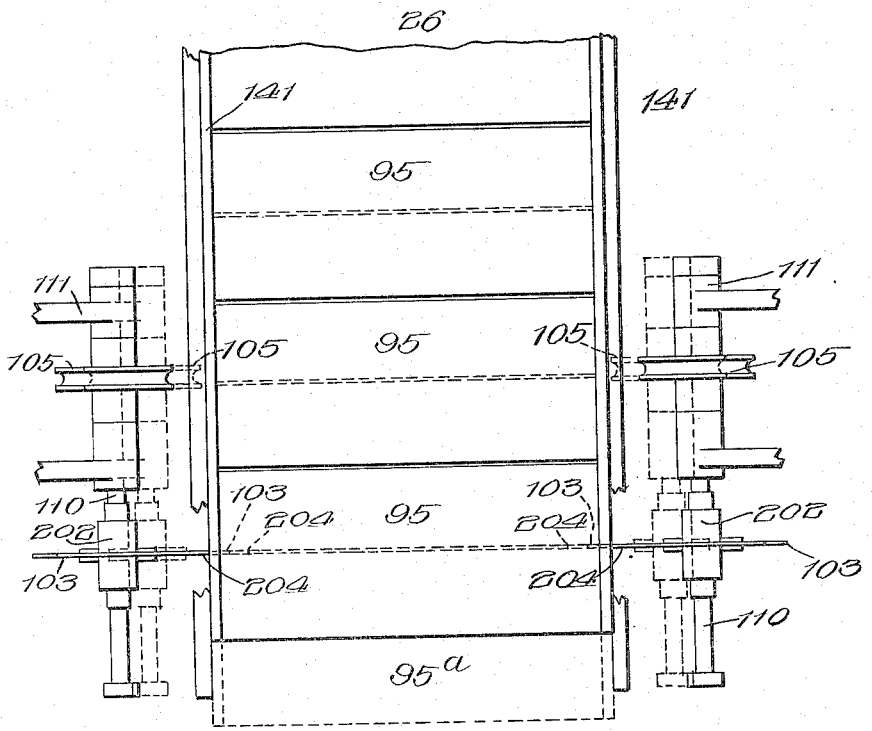

JOHN N. J. HILBERT, OF CHICAGO, ILLINOIS, ASSIGNOR TO J. PHILIP BIRD, OF NEW YORK, N. Y.

BOX-MAKING MACHINE.

1,131,132.  Specification of Letters Patent.  Patented Mar. 9, 1915.

Application filed October 7, 1911. Serial No. 653,379.

*To all whom it may concern:*

Be it known that I, JOHN N. J. HILBERT, a citizen of the United States, residing at Chicago, in the county of Cook and State of Illinois, have invented new and useful Improvements in Box-Making Machines, of which the following is a full, clear, concise, and exact description, reference being had to the accompanying drawing, forming a part of this specification.

My invention relates to improvements in box making machines and has for its object the production of a machine in which after the boxes have been completed and are connected together within the well, they may be accurately separated without danger of injury to any box.

A further object is the provision of adjustable means for accurately regulating the working position of the separating means.

A further object is the production of a device of comparatively simple construction that can be used in connection with certain types of machines without materially altering the machine.

A further object is the production of a machine of comparatively cheap construction and one that is not liable to disarrangement of parts.

These, and such other objects as may hereinafter appear, are attained by my device, an embodiment of which is illustrated in the accompanying drawings, in which:

Figure 1 represents a side elevation of a box making machine embodying my device; Fig. 2 represents a top plan view of Fig. 1 with the standard and plunger removed; Fig. 3 represents a vertical sectional view on the line 3—3 of Fig. 4 looking in the direction indicated by the arrows; Fig. 4 represents a horizontal sectional view on the line 4—4 of Fig. 1 looking in the direction indicated by the arrows; Fig. 5 represents a vertical sectional view on the line 5—5 of Fig. 4 looking in the direction indicated by the arrows; Fig. 6 represents an enlarged elevation of one of the saws and adjustments partly in section on line 6—6 of Fig. 7; Fig. 7 represents a sectional view on the line 7—7 of Fig. 6 looking in the direction indicated by the arrows; Fig. 8 represents an end elevation of Fig. 6; Fig. 9 represents a sectional view on the line 9—9 of Fig. 7 looking in the direction indicated by the arrows; and Fig. 10 represents a diagrammatic view showing the boxes in the well and the saws in position.

Like numerals of reference indicate like parts in the several figures of the drawings.

Referring now to the drawings for the purpose of outlining broadly the structure and operation of the machine to which my improvement is applicable; the box former 22 secured to the bottom of the plunger 23 is adjusted to the exact size required, and by the adjustment of the guides 24 on the table 25, the well 26 is made to conform to the size and shape of the box former, but sufficiently larger to permit the former to force the material from which the box or cover is to be made between its sides and the sides of the well. The stroke of the plunger is regulated so that the box former will pass within the well 26 and downwardly a distance equal to the inside depth of the box or cover that is being made. The separator fingers 27 are so adjusted that when they are forced outwardly within the well and the box or cover forced downwardly by the plunger, the bottom of the box or cover will just rest on top of the separator fingers 27.

The feed box 28 is provided with an opening (not shown) on the front, the vertical depth of which is adjusted to suit the thickness of the cardboard or other material from which the box or cover is to be formed so that the blanks are forced through the opening one at a time. The blanks, after leaving the feed box, fall on the table under the former and are held in proper position by means of stops or guides. The operation of the machine then forces the plunger downwardly as above described and the box or cover is formed in shape.

The tape or staying material 61 is unwound from the rolls 55 and moistened or pasted by means of the sponge or moistener 62 and brought through guides and into a vertical position adjacent the outer corners of the box. The separator fingers 27 which have been forced downwardly until they have reached the proper position, depending upon the depth of the box or cover, are then withdrawn and the fingers, when released from that position beneath the box or cover, fly upwardly and inwardly sufficient to serve the purpose of strippers when the plunger is withdrawn. During this period the plunger dwells and the tape is pasted in place, and, if desired, is partly severed. The details of this pasting and partially severing operation are described in an application filed by me under date of August 12, 1908, Serial No. 448,159, and need not be further alluded to in this application. The plunger having drawn the former from the well and the separator fingers acting as strippers holding the box or cover in place, the separator fingers resume their normal position projecting within the well in position to be engaged by the next box or cover and forced downwardly to their lowermost position. This operation is repeated until the well is filled with a string of boxes or covers held together at their four corners by continuous strips of tape.

At a predetermined time, depending upon the size of the box or cover, the lowermost box or cover will reach a point in the bottom of the well where the complete severing of the box or cover from the string will take place. This operation which comprises the essence of my invention will be fully described in detail later. The separated box or cover will then drop on a continuously moving carrier 33, and the box or cover be carried away from the machine.

In an application filed by James Philip Bird August 12th, 1908, Serial No. 448,160, the complete and detailed operation of this machine which has been briefly described above, is given in full detail and reference is made to that application for any explanation desired that is not given here.

Referring now to Fig. 4, a series of four circular saws 103 are revolved continuously by means of drives 104, the belts 106 passing around said drives and a series of idlers 107 arranged to guide the belt into proper position, one pair of idlers 108 being used to automatically tighten the belts through the medium of weights 109. The saws 103 are mounted on arbors 110 running in frame 111, the pulleys 105 being rigid on the arbors 110 and are arranged for horizontal adjustment in one direction, the adjustment at right angles thereto being taken care of by means of handles 112 operating guides 113 that move in horizontal cross-bars 114 to which the frames are secured. The slidable bearings 115 are mounted on the saw platen and held in place by the gibs 117. The saws are brought into active cutting engagement with the strips between the boxes or covers through the medium of a bell crank lever 118 engaging the face of a suitable cam 119 on the shaft 60. The saw platen 116 is mounted for vertical adjustment on four screws 120 working in unison in bearings 121 on the main frame.

Referring now to Figs. 6-9, inclusive, the saw 103 is splined on the arbor 110 and rests on the top of a spring 200 surrounding the lower end of the arbor shaft. Loosely mounted on the arbor is a feeler frame or yoke frame comprising in this instance a pair of yokes 202 on the extended ends of which are brazed tubs 203 encircling the arbor. The other ends are curved toward each other and united, as shown in Figs. 8 and 9. One of the members 202 is formed with a forwardly projecting arm or feeler 204 arranged to project a short distance beyond the line of the saw 103. A spring 206 is mounted on the feeler frame, one end of which is held against the stud 208 on the frame and the extended arm 209 of the spring rests against the post 210, holding the feeler arm normally in position shown in Fig. 7.

In Fig. 10, I have shown diagrammatically the well of the machine with a string of boxes or covers 95 held together by means of the tape 141. In the dotted position the feelers are projecting within the space between the boxes or covers and saws are severing the lowermost box or cover 95$^a$. In the full lines the saws are shown withdrawn by the operation of the cam 118 and the feelers resting against the sides of the box or cover as the string of boxes or covers drop downwardly within the well. The cam is so formed that as soon as the tape between the boxes is severed the saw frame is drawn quickly away from within the well, bringing the feeler out of engagement with the box or cover. The cam quickly returns the frame to such a position that the end of the feeler 204 engages the side of the box or cover. As the frame is gradually pushed inwardly by the revolution of the cam, the end of the feeler bears against the side of the descending box or cover, the feeler frame being held spring-pressed against the side and in the position shown in dotted lines in Fig. 7. When the cam throws the saw into cutting position, the feeler being on the plane with the saw enters the opening between the boxes or covers as shown in full lines in Fig. 7.

Heretofore in the event that the boxes or covers should vary slightly in depth or for any other reason the string was not accurately in position to be severed from the saws or put in operation, the saws would cut into the box or cover itself with the result that many boxes or covers would be ruined. By my improved device, the feeler is held spring-pressed against the side of the box or cover and when the string reaches the proper position to be operated upon by the saws, the feeler springs between the adjacent boxes or covers and holds them in line with the saws. Provided the saws are not in cutting position, the boxes or covers are prevented from becoming clogged in the well as the spring 200 permits the weight of the descending boxes or covers to force the feeler and saw downwardly until such a time as the saw shall have reached a cutting position.

It is clearly understood that my device is in the nature of a safety valve and its value does not appear during the ordinary working of the machine.

The vertical position of the saws is fixed by means of the screws 120, and the operation of the cams tend to have the saws perform their function at the proper time and the proper place, and in the ordinary operation, the small space between the lowermost box or cover and the one above comes directly in front of the saw just as the saw is forced into cutting position. It is thus apparent that the feeler would simply press against the sides of the descending box or cover and spring in between when the saw is ready to cut, and hence offer no hindrance to the efficient operation of the machine. When, however, for any reason, or for no apparent reason, the opening between the lowermost box or cover and the one adjacent thereto fails to retract with the saw at its moment of operation, the feeler automatically keeps two boxes or covers in proper position to be operated upon by the saws until the saws are brought into operative position. This could be effected without the spring 200, but it might result in the tendency of the boxes or covers to clog or choke the well hindering the effective operation of the machine.

While the severing means in this application as well as the other applications referred to, have been circular saws revolved at each corner of the box or cover, I do not limit myself to such severing means in this application, as the principles of my present application are as well applicable to machines in which other than saws are used as the severing means.

In view of the fact that the weight of the string of boxes or covers is inconsiderable, I find it best to make both the springs 200 and 206 of light material so that when the springs 206 are pressing against the sides of a box or cover in the downward movement of the string, the springs will offer a very slight resistance to the passage of the boxes or covers. The same with the spring 200 which supports the saw and feeder frame. This spring, of course, is considerably heavier than the spring 206, but it is so arranged as to simply support the saw and frame and any excess pressure, such, for instance, as that occasioned by the weight of the string of boxes or covers moving downwardly, causes the spring to be depressed and slide the saw and feeder frame downwardly on the arbor. In this construction the saw and frame are practically floating and while the spring 200 is not an absolute necessity, as noted above, still I find its use very advantageous.

While I have shown a simple means by which the desired result may be obtained, it is clear that other means may be used without depearting from the spirit of my invention, which contemplates the utilization of automatic means for bringing the material to be acted upon by the severing means in the proper position to be operated upon at the proper time.

I claim:

1. In a paper box making machine, the combination of a well of sufficient length to receive and hold a plurality of boxes, a reciprocating former adapted to work in the upper end of the well to fold the box blank into finished shape, means for supplying an adhesive tape to each corner of the well and applying it to the adjacent corner of the box after the box is formed in the well, means for pressing the tape thus drawn in against the corners of the box while the reciprocating former is withdrawn from the well, whereby by said folding operation the boxes will be pushed down into the well in succession and each preceding box will pull into the well a sufficient length of tape to extend the full length of the corners of the next succeeding box, whereby upon discharge from the lower end of the well the boxes will all be flexibly connected together at their corners by said tapes, means for severing the tape between the boxes, and means for automatically preventing the severing means from cutting a box.

2. In a box making machine, box forming mechanism, a series of severing means whereby the lowermost of a string of completed boxes or covers are successively cut from the string, and means for automatically holding said lowermost box or cover in position until operated upon by said severing means.

3. In a box making machine, box forming mechanism, a series of severing means whereby the lowermost of a string of completed boxes or covers are successively cut from the string, means for automatically holding said lowermost box or cover in position until operated upon by said severing means, and means for bringing said holding means into and out of operative engagement.

4. In a box making machine, box forming mechanism, a series of severing means whereby the lowermost of a string of completed boxes or covers are successively cut from the string, means for automatically holding said lowermost box or cover in position until operated upon by said severing means, and means including a cam for bringing said holding means into and out of operative engagement.

5. In a box making machine, box forming mechanism, a series of severing means whereby the lowermost of a string of completed boxes or covers are successively cut from the string, and spring controlled means for automatically holding said lowermost box or cover in position until operated upon by said severing means.

6. In a box making machine, box forming mechanism, a series of severing means whereby the lowermost of a string of completed boxes or covers are successively cut from the string, spring controlled means for automatically holding said lowermost box or cover in position until operated upon by said severing means, and means for bringing said holding means into and out of operative engagement.

7. In a box making machine, box forming mechanism, a series of severing means whereby the lowermost of a string of completed boxes or covers are successively cut from the string, spring controlled means for automatically holding said lowermost box or cover in position until operated upon by said severing means, and means including a cam for bringing said holding means into and out of operative engagement.

8. In a box making machine, box forming mechanism, a series of severing means whereby the lowermost of a string of completed boxes or covers are successively cut from the string, and means for automatically holding said lowermost box or cover in position until operated upon by said severing means, said means comprising a finger adapted to enter the space between the lower two boxes or covers in advance of the severing mechanism.

9. In a box making machine, box forming mechanism, a series of severing means whereby the lowermost of a string of completed boxes or covers are successively cut from the string, and means for automatically holding said lowermost box or cover in position until operated upon by said severing means, said means comprising a finger lying in the same horizontal plane as the severing means and adapted to enter the space between the lower two boxes or covers in advance of said severing mechanism.

10. In a box making machine, box forming mechanism, a series of severing means whereby the lowermost of a string of completed boxes or covers are successively cut from the string, and means for automatically holding said lowermost box or cover in position until operated upon by said severing means, said means comprising a spring actuated finger adapted to enter the space between the lower two boxes or covers in advance of the severing mechanism.

11. In a box making machine, box forming mechanism, a series of severing means whereby the lowermost of a string of completed boxes or covers are successively cut from the string, and means for automatically holding said lowermost box or cover in position until operated upon by said severing means, said means comprising a spring actuated finger lying in the same horizontal plane as the severing means and adapted to enter the space between the lower two boxes or covers in advance of said severing mechanism.

12. In a box making machine, box forming mechanism, a series of floating severing means whereby the lowermost of a string of completed boxes or covers are successively cut from the string, and means for automatically holding said lowermost box or cover in position until operated upon by said severing means.

13. In a box making machine, box forming mechanism, a series of floating severing means whereby the lowermost of a string of completed boxes are successively cut from the string, means for automatically holding said lowermost box or cover in position until operated upon by said severing means, and means for bringing said holding means into and out of operative engagement.

14. In a box making machine, box forming mechanism, a series of floating severing means whereby the lowermost of a string of completed boxes or covers are successively cut from the string and means for automatically holding said lowermost box or cover in position until operated upon by said severing means, said means comprising a finger adapted to enter the space between the lower two boxes or covers in advance of the severing mechanism.

15. In a box making machine, box forming mechanism, a series of floating severing means whereby the lowermost of a string of completed boxes or covers are successively cut from the string, and means for automatically holding said lowermost box or cover in position until operated upon by said severing means, said means comprising a spring actuated finger lying in the same horizontal plane as the severing means and adapted to enter the space between the lower two boxes or covers in advance of said severing mechanism.

16. In a box making machine, a frame, means for successively forming a single box or cover so that there is within the machine a string of completed boxes or covers united to each other at their corners by strips of material and a series of saws by which the lowermost of said string is severed therefrom, together with means for bringing said saws into and out of operative engagement, and automatic means mounted in the same plane with the saws and vertically movable therewith and adapted to enter the space above the lowermost box or cover in advance of said saws and to remain in said position until said box or cover has been severed.

17. In a box making machine, a frame, means for successively forming a single box or cover so that there is within the machine a string of completed boxes or covers united to each other at their corners by strips of material and a series of floating saws by which the lowermost of said string is severed therefrom, together with means for bringing said saws into and out of operative engagement, and automatic means mounted in the same plane with the saws and vertically movable therewith and adapted to enter the space above the lowermost box or cover in advance of said saws and to remain in said position until said box or cover has been severed.

18. In a box making machine, a frame, means for successively forming a single box or cover so that there is within the machine a string of completed boxes or covers united to each other at their corners by strips of material and a series of saws by which the lowermost of said string is severed therefrom, together with means for bringing said saws into and out of operative engagement, and spring controlled fingers mounted in the same plane with the saws and vertically movable therewith and adapted to enter the space above the lowermost box or cover in advance of said saws and to remain in said position until said box or cover has been severed.

19. In a box making machine, a frame, means for successively forming a single box or cover so that there is within the machine a string of completed boxes or covers united to each other at their corners by strips of material and a series of floating saws by which the lowermost of said string is severed therefrom, together with means for bringing said saws into and out of operative engagement, and spring controlled fingers mounted in the same plane with the saws and vertically movable therewith and adapted to enter the space above the lowermost box or cover in advance of said saws and to remain in said position until said box or cover has been severed.

20. In a box making machine, box forming mechanism, a series of spring supported severing means whereby the lowermost of a string of completed boxes or covers are successively cut from the string, and means for automatically holding said lowermost box or cover in position until operated upon by said severing means.

21. In a box making machine, box forming mechanism, a series of spring supported severing means whereby the lowermost of a string of completed boxes or covers are successively cut from the string, means for automatically holding said lowermost box or cover in position until operated upon by said severing means, and means for bringing said holding means into and out of operative engagement.

22. In a box making machine, box forming mechanism, a series of spring supported severing means whereby the lowermost of a string of completed boxes or covers are successively cut from the string, and means for automatically holding said lowermost box or cover in position until operated upon by said severing means, said means comprising a finger adapted to enter the space between the lower two boxes or covers in advance of the severing mechanism.

23. In a box making machine, a frame, means for successively forming a single box or cover so that there is within the machine a string of completed boxes or covers united to each other at their corners by strips of material and a series of spring supported saws by which the lowermost of said string is severed therefrom, together with means for bringing said saws into and out of operative engagement, and spring controlled fingers mounted in the same plane with the saws and vertically movable therewith and adapted to enter the space above the lowermost box or cover in advance of said saws and to remain in said position until said box or cover has been severed.

24. In a box machine, a well of sufficient length to receive and hold a plurality of shaped boxes, a reciprocating former adapted to enter the upper end of the well to thus fold the blanks into box form, means for engaging the upper edge of each box to hold it in the well upon withdrawal of the reciprocating former, whereby successive operations of the former will charge the well with a series of superposed boxes, means for leading an adhesive tape into each corner of the well at a point where it will contact with the adjacent corner of the box, and means for pressing the tapes against the corners of the box during the outward movement of the plunger, whereby each preceding box when it is pushed down by a succeeding box will draw into the well a sufficient length of tape to extend the full length of the corners of the succeeding box, whereby when the completed boxes are discharged from the well they will be connected together by the tapes, means for severing the tape between the boxes, and means for automatically preventing the severing means from cutting a box.

25. In a paper box making machine of the class described, a well, a reciprocating former adapted to fold a blank as it enters the upper end of the well, said well having sufficient length to accommodate a plurality of superposed boxes, means for leading a tape into the well coincident with each vertical joint in the box, the tapes entering the well at a point below the upper end thereof so as to come into contact with the joints of the box after the same is shaped by the folding means, means for pressing the tapes against the joints in the box during the outward reciprocation of the former, whereby as each preceding box is forced down into the well it will draw into the well a sufficient length of tape to extend the full length of the joints of the succeeding box, substantially as set forth, means for severing the tape between the boxes, and means for automatically preventing the severing means from cutting a box.

In witness whereof, I have hereunto subscribed my name in the presence of two witnesses.

JOHN N. J. HILBERT.

Witnesses:
E. R. KING,
C. D. DAVIS.